United States Patent [19]

Hathaway

[11] 4,121,786
[45] Oct. 24, 1978

[54] COAXIAL REEL SYSTEM

[75] Inventor: Richard A. Hathaway, Saratoga, Calif.

[73] Assignee: Ampex Corporation, Redwood City, Calif.

[21] Appl. No.: 802,840

[22] Filed: Jun. 2, 1977

[51] Int. Cl.² .................... G03B 1/04; G11B 15/32
[52] U.S. Cl. .................................. 242/193; 352/156
[58] Field of Search ............... 242/68.3, 193, 194; 352/156

[56] References Cited

U.S. PATENT DOCUMENTS

| | | | |
|---|---|---|---|
| 3,289,961 | 12/1966 | Glenn, Jr. | 242/193 |
| 3,669,384 | 6/1972 | Hathaway | 242/194 |

*Primary Examiner*—Leonard D. Christian

[57] ABSTRACT

A pair of reel spindles are mounted on the same axis normal to a tape deck, the inboard spindle adjacent the tape deck being journalled for independent rotation upon the exterior of a bearing means extending from the deck, and the outboard spindle remote from the deck being mounted on a shaft extending interiorally of the bearing means for independent rotation with respect to the outboard spindle. The inboard spindle includes a turntable flange and key portions extending into keyways in the inboard reel. The outboard spindle has radially extending key portions mating with the keyways of the inboard reel, to permit passage of the inboard reel freely to and from the inboard spindle. The outboard reel is provided with truncated keyways that mate with the outboard spindle keys but prevent passage of the outboard reel inboardly to the region of the inboard spindle.

8 Claims, 3 Drawing Figures

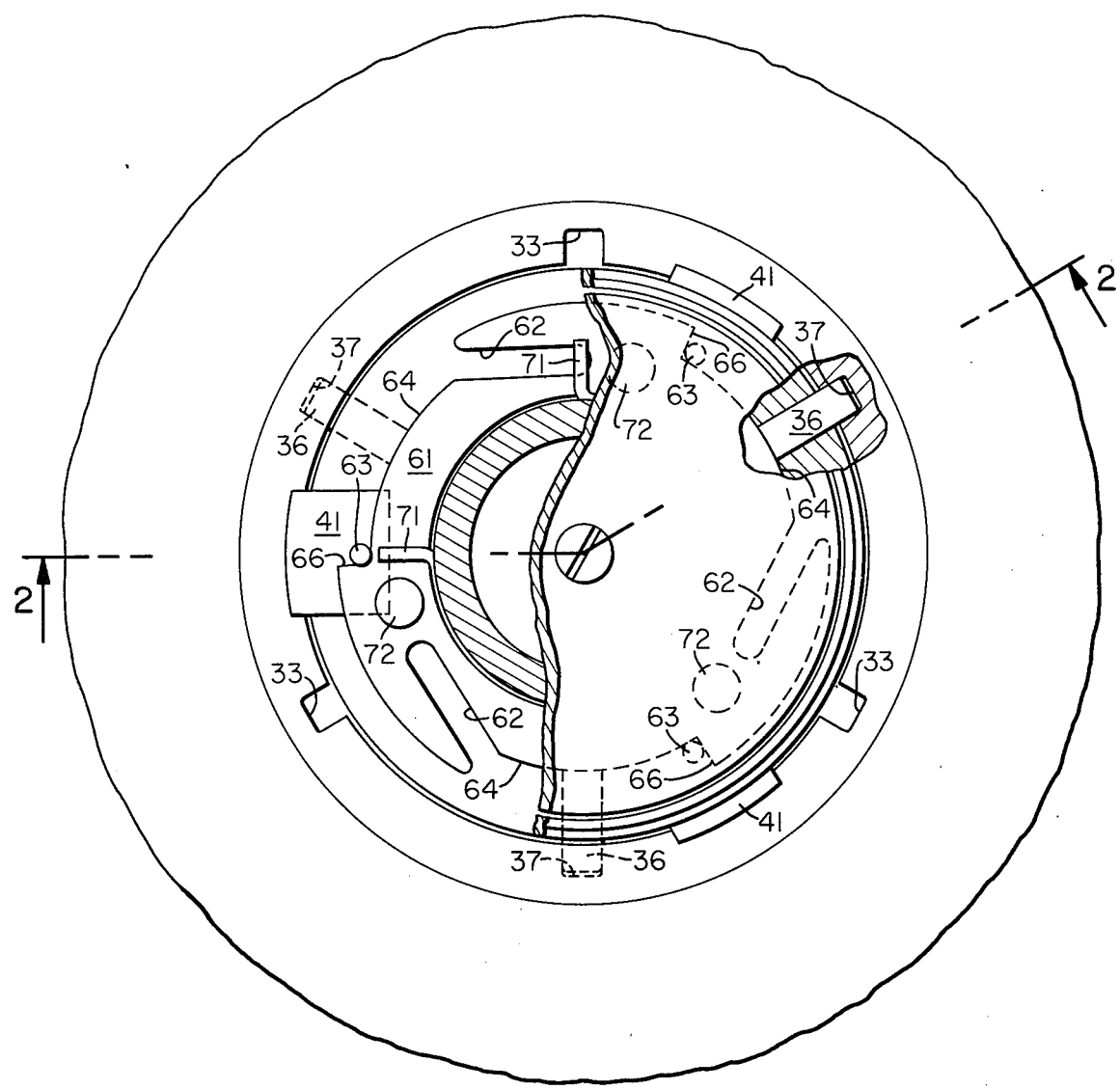
FIG_1
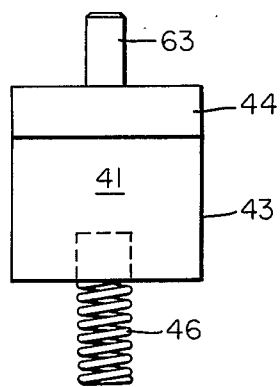
FIG_3

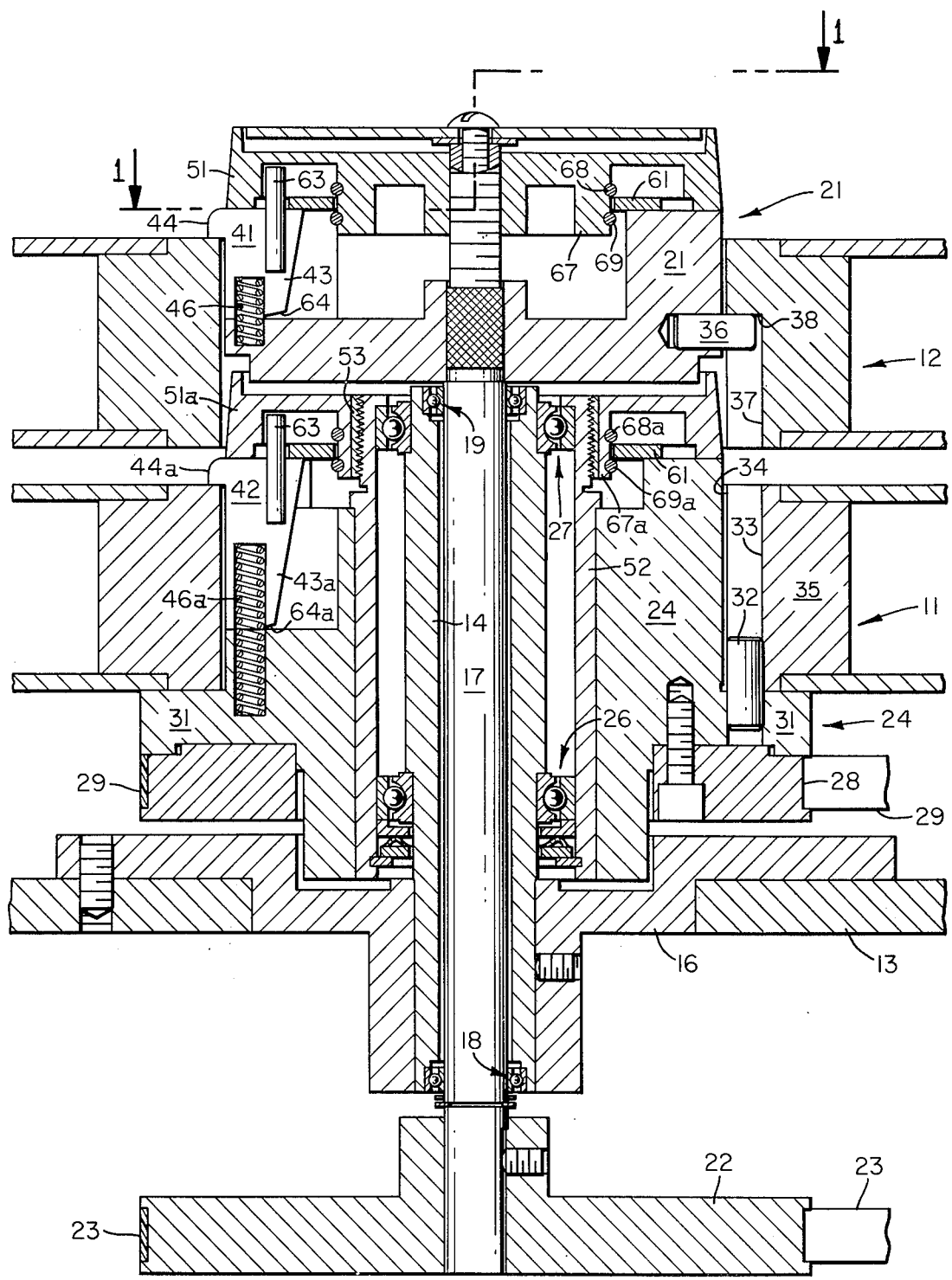
FIG_2

COAXIAL REEL SYSTEM

BACKGROUND OF THE INVENTION

This invention relates to coaxial reel systems, and particularly to such systems used in the magnetic tape recording and reproducing arts.

In the magnetic tape transport art, it is occasionally desired to mount the tape supply and takeup reels coaxially, primarily to save space, and to make a more compact assembly, as for portability. In a portable transport for television recording, as of news events, for example, the camera operator usually carries the camera in a braced mount upon his shoulder, and the tape transport in a pack upon his back. Such a transport should therefore be no wider than the operator's shoulders and not much longer, to avoid encumbering the movements of the operator in crowds or in restricted spaces. The coaxial reel arrangement is of especial advantage in such use, if the television recording system is of the helical scan type, for then the tape enters the scanning zone at a different level that that at which it leaves, and the reels may be mounted coaxially at the same respective levels. Such is the environment for which the present reel system was devised.

In such a system, it is usually advantageous to have the inboard spindle, adjacent the tape deck, journalled for rotation upon a bearing means that extends from the deck or mounting element and passes entirely through the inboard spindle, while the outboard spindle is mounted on a shaft that passes in turn entirely through the bearing means. Thus both spindles may be driven by pulleys, belts and motors located entirely beneath the tape deck, or at least out of sight and protected from damage. The inboard spindle usually has a turntable flange to support the inboard reel, and key means mating with keyways in the hub opening of the inboard reel. Preferably the inboard reel at least is an "industry-standard" type, with three angularly equi-spaced keyways extending in an axial direction entirely through the reel hub. Usually in the art, the outboard reel is also of the "industry-standard" type and the outboard spindle also has key means mating with the keyways of both reels. The inboard reel, which is mounted first, of course can slide freely over the outboard spindle keys to its correct position on the inboard spindle. The problem is to prevent the outboard reel from doing the same thing. In other words, the task of the art is to find means which will act as turntable retaining and supporting means for the outboard reel, but will still allow free passage of the inboard reel.

Accordingly, it is an object of the present invention to provide a coaxial reel system in which the inboard reel passes freely over the outboard spindle, but the outboard reel does not.

BRIEF DESCRIPTION OF THE INVENTION

This and other objects are attained in the present invention by means of the following structure. A pair of reel spindles are mounted on the same axis normal to a tape deck, the inboard spindle adjacent the tape deck being journalled for independent rotation upon the exterior of a bearing means extending from the deck, and the outboard spindle remote from the deck being mounted on a shaft extending interiorally of the bearing means for independent rotation with respect to the outboard spindle. The inboard spindle includes a turntable flange and key portions extending into keyways in the inboard reel. The outboard spindle has radially extending key portions mating with the keyways of the inboard reel, to permit passage of the inboard reel freely to and from the inboard spindle. The outboard reel is provided with truncated keyways that mate with the outboard spindle keys but prevent passage of the outboard reel inboardly to the region of the inboard spindle.

DESCRIPTION OF THE DRAWINGS

FIG. 1 is a broken away plan view of the invention, with the broken-away portions taken in section substantially on the plane of lines 1—1 of FIG. 2;

FIG. 2 is a cross-sectional elevation view of the invention, taken substantially on the plane of lines 2—2 of FIG. 1; and FIG. 3 is a detail view of a portion of the apparatus of FIGS. 1 and 2.

DETAILED DESCRIPTION

Referring now to FIG. 1 and particularly to FIG. 2, there is shown a system for coaxial mounting of a pair of reels 11 and 12 respectively inboard and outboard with respect to a tape deck or mounting element 13. A bearing support element 14 is provided, attached to the element 13 by means of an intermediate collar 16. The support element 14 is formed as a hollow cylindrical sleeve with an interior shaft 17 journalled therein as by means of ball bearing assemblies 18, 19. To mount the outboard reel 12, an outboard spindle 21 is attached securely to the knurled outboard end of the shaft 17; and to drive the shaft and spindle 21, a pulley 22 is secured to the inboard end of the shaft, to be driven by a drive belt 23 from a drive means such as a motor not here shown.

The inboard reel 11 is mounted in turn upon an inboard spindle 24, which is journalled for rotation upon the exterior portion of sleeve 14, as by means of ball bearing assemblies 26 and 27; and a pulley 28 is mounted on the spindle, by which the spindle may be driven as by a belt 29 and a motor, not here shown.

To support the inboard reel 11 against axial movement too far toward the deck 13, the inboard spindle 24 is formed with a turntable portion or circumferential flange 31, which has three angularly equi-spaced key pins 32 (of which only one is shown in FIG. 2) extending outboardly therefrom, for engaging corresponding keyways 33 formed in the central hub opening 34 of the hub 35 of the inboard reel 11.

It will be understood that the reel 11 is made as an "industry-standard" type reel, one of the required features of which is that the hub opening 34 and the three angularly equi-spaced keyways 33 have standard dimensions common in the industry for ease of interchangeability; and another feature of which is that the keyways 33 are formed entirely through the full axial dimension of the reel 11. As a consequence, the reel 11, in passage over the outboard spindle 21, passes clearly over a trio of angularly equi-spaced keying studs 35 with which the outboard spindle is provided for purposes of keying to the outboard reel 12 when the latter in turn is mounted.

The problem now arises, of providing some means performing a function for the outboard reel such as the supporting function that is performed by the turntable flange 31 for the inboard reel 11, but yet without interfering with free passage of the inboard reel to and fro over the outboard spindle.

It has been known in the art to provide retractable turntable elements for the outboard spindle, which can be extended radially outwardly after the inboard reel has been mounted. However, such a solution, while suitable for the laboratory, requires more complex structure than is desirable for portable outdoor equipment.

In the present invention the solution is achieved by providing an outboard reel with keyways 37, which are truncated at the outboard end as by a face 38 which rests upon the corresponding key stud 36 and prevents further movement of the reel inboardlywise.

The fact that the keyways 37 are truncated does not negate interchangeability of reels, for the keyways 37 may be provided in an otherwise standard reel having the standard full-length keyways 33; the two sets of keyways being angularly interleaved as illustrated in FIG. 1. In fact the inboard reel can additionally be provided with truncated keyways 37, so that the two reels are identical and therefore interchangeable with one another for use as either inboard or outboard reels.

The reels are further secured to the spindles by means of two angularly equi-spaced trios of hold-down clamps 41 and 42, which operate as follows.

Each clamp 41 comprises a body 43 (43a) with a radially-outwardly extending clamping lip 44 (44a) (see also FIG. 3) adapted to bear against the outboard side of the corresponding reel and clamp it axially against the corresponding studs 36 (or turntable flange 31 in the case of reel 11). A helical coil compression spring 46 (46a) is mounted in vertically aligned recesses in the body 43 (43a) and in the body portion of the corresponding spindle 21 (24), to position the clamp 41 (42) and to help loosen the clamp from clamping position when it is desired to to release the reels. Pressure for moving the clamps axially to clamping position is provided by a manually-operated screw-down knob 51 (51a), which is threaded upon the shaft 17 in the case of the outboard spindle, and upon the exterior of a sleeve 52 which is secured in the inboard spindle and serves to mount the bearings 26, 27. The threaded portion of knob 51a is formed in an interior sleeve 53 secured in the knob. Knob 51 when it is screwed down, bears against the top of clamps 41 and drives them axially into clamping position; knob 51a performs similarly for clamps 42.

To swing the clamping lips 44, 44a radially outwardly when the knobs are tightened down, and radially inwardly when the knobs are loosened, to permit free removal of the reels, each knob is provided with a cam plate 61, which has three slanted slots 62 suitable for engaging a set of pins 63 extending from the tops of the corresponding clamps 41, 42. As the knob 51 (51a) is screwed counterclockwise as for releasing the clamps, the clamps are pivoted radially inwardly upon a lower rocking surface 64 (64a) thereof, and about a pivot point at the place where the spring 46 (46a) joins the clamp and spindle. Conversely, when the knobs are screwed clockwise, as for tightening, the pins 63 are caused to leave the slots 62, and are forced radially outwardly into clamping position by a cam surface 64 of the plate, until the pin engages a cam stop shoulder 66 of the plate. After reaching this stage, the plate remains with the pins while the knob is further tightened to clamp the reel.

To provide sufficient frictional coupling between the cam plate and knob to move the plate initially when desired, and yet to be over-ridden when the shoulder 66 encounters the pin 63, the plate is secured loosely to the central arbor portion 67 (67a) as by means of two axially bracketing snap rings 68 (68a) and 69 (69a) riding in corresponding anular grooves in the arbor. The outboard snap ring 68 (68a) has two radially outturned ends (71 (71a) which engage adjacent lugs 72 (72a) on the plate whenever the knob is turned. The snap ring 68 (68a) is sufficiently tight on the knob to move the plate 61 initially for projection or retraction of the clamping lips 44 (44a), but yet will slide in its seating groove when the shoulders 66 encounter the pins 63 and it is desired to further screw the knob into clamping or releasing position.

Thus the invention has been described as follows. A pair of reel spindles are mounted on the same axis normal to a tape deck, the inboard spindle adjacent the tape deck being journalled for independent rotation upon the exterior of a bearing means extending from the deck, and the outboard spindle remote from the deck being mounted on a shaft extending interiorally of the bearing means for independent rotation with respect to the outboard spindle. The inboard spindle includes a turntable flange and key portions extending into keyways in the inboard reel. The outboard spindle has radially extending key portions mating with the keyways of the inboard reel, to permit passage of the inboard reel freely to and from the inboard spindle. The outboard reel is provided with truncated keyways that mate with the outboard spindle keys but prevent passage of the outboard reel inboardly to the region of the inboard spindle.

I claim:

1. In reel and spindle means of the type mounting a pair of reels coaxially on a tape deck with one reel inboard adjacent the deck and the other reel outboard remote from the deck, the outboard reel spindle being mounted for independent rotation with a shaft extending coaxially within journal bearing means attached to the tape deck, and the inboard reel spindle being mounted for independent rotation exteriorally and peripherally upon the same journal bearing means, the improvement comprising:

means on said spindles for securing said respective reels to said spindles for rotation therewith, said means including key means on at least said outboard spindle;

said inboard reel having a central hub opening with a first type keyway formed therein for passage over said outboard spindle and key means to a position of rotationally-secured impalement upon said inboard spindle;

said outboard reel having a central hub opening with a second type truncated keyway formed therein, permitting keyed impalement of said outboard reel upon said outboard spindle, and conjoint support of the outboard reel upon the outboard spindle in axially spaced relation to said inboard reel and inboard spindle;

turntable means being provided on said inboard spindle for conjoint support of said inboard reel in axially spaced relation to said tape deck;

said outboard key means comprising three angularly equispaced studs extending radially from said outboard spindle; and said first type keyway being formed as three angularly equispaced grooves extending axially along the inner face of said inboard reel hub opening for the full axial dimension of said inboard reel;

whereby said inboard reel is adapted to pass freely over and axially inboard of said outboard spindle with said grooves mated with said studs and passing freely slidingly thereover.

2. The combination recited in claim 1, wherein said second truncated type keyway is formed as three angularly equispaced grooves extending axially along the inner face of said outboard reel hub opening from the inboard face of said outboard reel, said last-named grooves terminating in a truncate, inboardly-facing, face normal to the axis of said reel and spaced axially from the outboard face of said outboard reel;

said truncate face serving as a means for supporting said outboard reel upon said outboard spindle and for preventing said outboard reel from passing inboardly beyond said outboard spindle toward said inboard spindle.

3. The combination recited in claim 2, wherein each of said spindles is provided with hold-down clamping means for extending radially outwardly and engaging the outboard faces of the respective reels and clamping said reels axially against the respective studs and turntable means of said respective outboard and inboard spindles.

4. The combination recited in claim 3, wherein said hold-down clamping means have retracted positions radially withdrawn inwardly of the outer peripheral surface of the corresponding spindle, for clear passage of the corresponding reels to fully seated position upon said respective studs and turntable means.

5. The combination as recited in claim 4, wherein said turntable means comprises a peripheral flange formed on said inboard spindle at the inboard end thereof.

6. The combination as recited in claim 5, wherein the inboard spindle reel securing means comprises three angularly equispaced inboard studs axially extending from said turntable flange for mating with said inboard reel keyway grooves.

7. The combination recited in claim 1, wherein said outboard reel also has a first type keyway formed therein and angularly spaced from said second truncated type keyway thereof, adapting said outboard reel for contingent use as an inboard reel.

8. The combination recited in claim 7, wherein said inboard reel also has a second type truncated keyway formed therein and angularly spaced from said first type keyway thereof, said inboard and outboard reels being identical and consequently interchangeably usable on either spindle.

* * * * *